US012655999B2

(12) United States Patent
Kim et al.

(10) Patent No.: US 12,655,999 B2
(45) Date of Patent: Jun. 16, 2026

(54) DEVICE FOR REDUCING NOISE OF COMPRESSOR IN AIR CONDITIONER

(71) Applicant: Samsung Electronics Co., Ltd., Suwon-si (KR)

(72) Inventors: Munsub Kim, Suwon-si (KR); Hyunwuk Kang, Suwon-si (KR); Junyeong Kim, Suwon-si (KR); Taeryong Seong, Suwon-si (KR); Jaewoo Choi, Suwon-si (KR); Duhan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 18/665,903

(22) Filed: May 16, 2024

(65) Prior Publication Data

US 2024/0302057 A1 Sep. 12, 2024

Related U.S. Application Data

(63) Continuation of application No. PCT/KR2022/019123, filed on Nov. 29, 2022.

(30) Foreign Application Priority Data

Feb. 3, 2022 (KR) ........................ 10-2022-0014242

(51) Int. Cl.
*F24F 1/12* (2011.01)
*F04B 39/00* (2006.01)
(Continued)

(52) U.S. Cl.
CPC ............ *F24F 1/12* (2013.01); *F04B 39/0033* (2013.01); *F04B 53/16* (2013.01); *F24F 13/24* (2013.01);
(Continued)

(58) Field of Classification Search
CPC ...... F04B 53/001; F04B 53/002; F04B 53/16; F04B 39/0027; F04B 39/0033;
(Continued)

(56) References Cited

U.S. PATENT DOCUMENTS 5,272,285 A * 12/1993 Miller ..................... F01C 21/10
181/202
6,062,033 A * 5/2000 Choi ........................ F24F 13/24
62/296
(Continued)

FOREIGN PATENT DOCUMENTS

CN 205089556 U 3/2016
CN 107435637 A 12/2017
(Continued)

OTHER PUBLICATIONS

Extended European Search Report dated Jan. 9, 2025 issued in European Patent Application No. 22925100.4.
(Continued)

*Primary Examiner* — Christopher R Zerphey
(74) *Attorney, Agent, or Firm* — Nixon & Vanderhye P.C.

(57) ABSTRACT

Various embodiments of the present disclosure relate to a side felt structure applied to reduce noise emitted from a compressor in an air conditioner. To this end, a device for reducing noise of an air conditioner may comprise: a terminal block disposed to protrude from the outer peripheral surface of a compressor; a side felt disposed to encompass the compressor, and including an opening allowing the terminal block to be seen from the outside; and a terminal block cover felt extending from one side of the opening formed in the side felt, so as to open/close at least a portion of the opening.

20 Claims, 27 Drawing Sheets

(51) Int. Cl.
*F04B 53/16* (2006.01)
*F24F 13/24* (2006.01)
*G10K 11/16* (2006.01)

(52) U.S. Cl.
CPC ........ *G10K 11/16* (2013.01); *F24F 2013/242* (2013.01)

(58) Field of Classification Search
CPC ... F04B 39/0038; F24F 1/12; F24F 2013/242; F25B 2500/12; G10K 11/16; G10K 11/1752
See application file for complete search history.

(56) References Cited

U.S. PATENT DOCUMENTS

| | | | | |
|---|---|---|---|---|
| 7,357,219 | B2 * | 4/2008 | Mafi | F24F 13/24 181/290 |
| 8,616,860 | B2 * | 12/2013 | Wollitz | F24F 1/12 181/207 |
| 10,677,477 | B2 | 6/2020 | Gotou et al. | |
| 11,486,590 | B2 * | 11/2022 | Sakai | F24F 1/12 |
| 11,761,676 | B2 * | 9/2023 | Otsuka | F24F 13/24 62/296 |
| 2014/0216094 | A1 * | 8/2014 | Hoshika | F24F 1/40 62/296 |
| 2019/0139528 | A1 * | 5/2019 | Lee | F04B 39/0072 |
| 2020/0333040 | A1 | 10/2020 | Otsuka et al. | |

FOREIGN PATENT DOCUMENTS

| | | | |
|---|---|---|---|
| JP | 2008202590 | A | 9/2008 |
| JP | 2010168940 | A | 8/2010 |
| JP | 2011158112 | A | 8/2011 |
| JP | 2016-121623 | | 7/2016 |
| JP | 2016205344 | A | 12/2016 |
| JP | 2017180946 | A | 10/2017 |
| JP | 6903170 | B2 | 6/2021 |
| KR | 20030053197 | A | 6/2003 |
| KR | 20140100044 | A | 8/2014 |
| KR | 101838077 | B1 | 3/2018 |
| KR | 10-2020-0089876 | | 7/2020 |
| KR | 20210071915 | A | 6/2021 |

OTHER PUBLICATIONS

European Notice of Allowance issued Jul. 28, 2025 in corresponding European Patent Application No. 22925100.4.
International Search Report for PCT/KR2022/019123 mailed Mar. 15, 2023, 5 pages.
Written Opinion of the ISA for PCT/KR2022/019123 mailed Mar. 15, 2023, 4 pages.

* cited by examiner

DEVICE FOR REDUCING NOISE OF COMPRESSOR IN AIR CONDITIONER

CROSS-REFERENCE TO RELATED APPLICATIONS

This application is a continuation of International Application No. PCT/KR2022/019123 designating the United States, filed on Nov. 29, 2022, in the Korean Intellectual Property Receiving Office and claiming priority to Korean Patent Application No. 10-2022-0014242, filed on Feb. 3, 2022, in the Korean Intellectual Property Office, the disclosures of each of which are incorporated by reference herein in their entireties.

BACKGROUND

Field

The disclosure relates to a noise blocking device for blocking noise radiated from a compressor of an air conditioner and a side felt structure for the same.

Description of Related Art

To block the noise radiated from the compressor of an air conditioner, felt with high noise-absorption performance may be applied to the outer circumferential surface of the compressor. For example, the felt may be provided in a side felt form for surrounding the side of the compressor or in an upper cover felt form for covering the top of the compressor.

Meanwhile, a scroll compressor may have a terminal block for connecting to the power line, which protrudes on the outer circumferential surface of the compressor. The terminal block should be designed to facilitate attachment/detachment of a terminal block cover not only for assembly during manufacture but also for later services.

Accordingly, it is critical to enable attachment/detachment of the terminal block cover even while the side felt is covered by deleting the terminal block portion of the side felt. In this case, a separately manufactured noise-absorbing cover may be applied to prevent noise leaking at the deleted terminal block portion of the side felt.

Typically, the noise blocking device provided in the compressor of the air conditioner using side felt may have a gap between the opening and the cover, so that noise generated from the compressor may leak to the outside.

SUMMARY

Embodiments of the disclosure may provide a noise blocking device for blocking noise from a compressor of an air conditioner considering a terminal block provided in the compressor.

Embodiments of the disclosure may provide a noise blocking device including a side felt structure for saving costs and preventing and/or reducing noise leakage while maintaining the serviceability of a terminal block of side felt applied to a compressor of an air conditioner to block noise.

A noise blocking device of an air conditioner according to an example embodiment of the disclosure may comprise: a compressor, a terminal block protruding from an outer circumferential surface of the compressor, a side felt disposed to surround the compressor and including an opening configured to allow the terminal block to be visible from an outside, and a terminal block cover felt extending from one side of the opening formed in the side felt and configured to open/close at least a portion of the opening.

A noise blocking device in an air conditioner according to an example embodiment of the disclosure may comprise: a compressor, a terminal block including first, second, third and fourth side surfaces and an outer surface surrounded by the first, second, third and fourth side surfaces and protruding from an outer circumferential surface of the compressor, a noise blocking side felt disposed to surround the compressor and including an opening configured to allow the terminal block to be visible from an outside, a terminal block cover felt extending from the side felt and configured to open/close at least a portion of the opening, and a holding member comprising a belt disposed in an area around the opening and having a fixed end configured to be fixed to the area around the opening and a free end configured to provide a force maintaining a shape of the side felt.

According to various example embodiments of the disclosure, it is possible to enhance noise blocking performance by minimizing and/or reducing noise leakage through an opening of side felt and to save costs and facilitate assembly by a structure capable of blocking up to the terminal block with a portion of the side felt. It is also possible to pull the cable of the compressor out of the side felt by forming a cable hole in the side felt.

BRIEF DESCRIPTION OF THE DRAWINGS

The above and other aspects, features and advantages of certain embodiments of the present disclosure will be more apparent from the following detailed description, taken in conjunction with the accompanying drawings, in which.

The same or similar reference numerals may be used to refer to the same or similar elements throughout the disclosure and the drawings.

DETAILED DESCRIPTION

Figure 1:
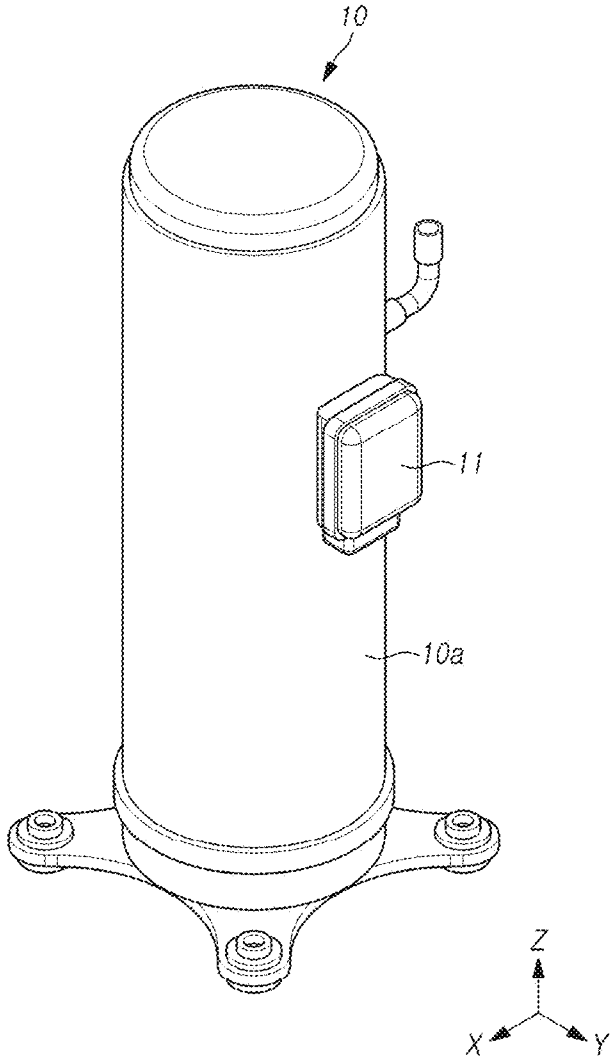
FIG. 1 is a perspective view illustrating a compressor of an air conditioner according various embodiments.

Embodiments of the present disclosure are now described in greater detail with reference to the accompanying drawings. However, the disclosure may be implemented in other various forms and is not limited to the embodiments set forth herein. The same or similar reference numerals may be used to refer to the same or similar elements throughout the disclosure and the drawings. Further, for clarity and brevity, no description may be made of well-known functions and configurations in the drawings and relevant descriptions.

Hereinafter, various example embodiments of the present disclosure are described with reference to the accompanying drawings. However, it should be appreciated that the present disclosure is not limited to the illustrated embodiments, and all changes and/or equivalents or replacements thereto also belong to the scope of the present disclosure.

FIGS. 1, 2, 3 and 4 are perspective views illustrating an example compressor included in an air conditioner and a structure of side felt receiving the compressor according various embodiments.

Figure 2:
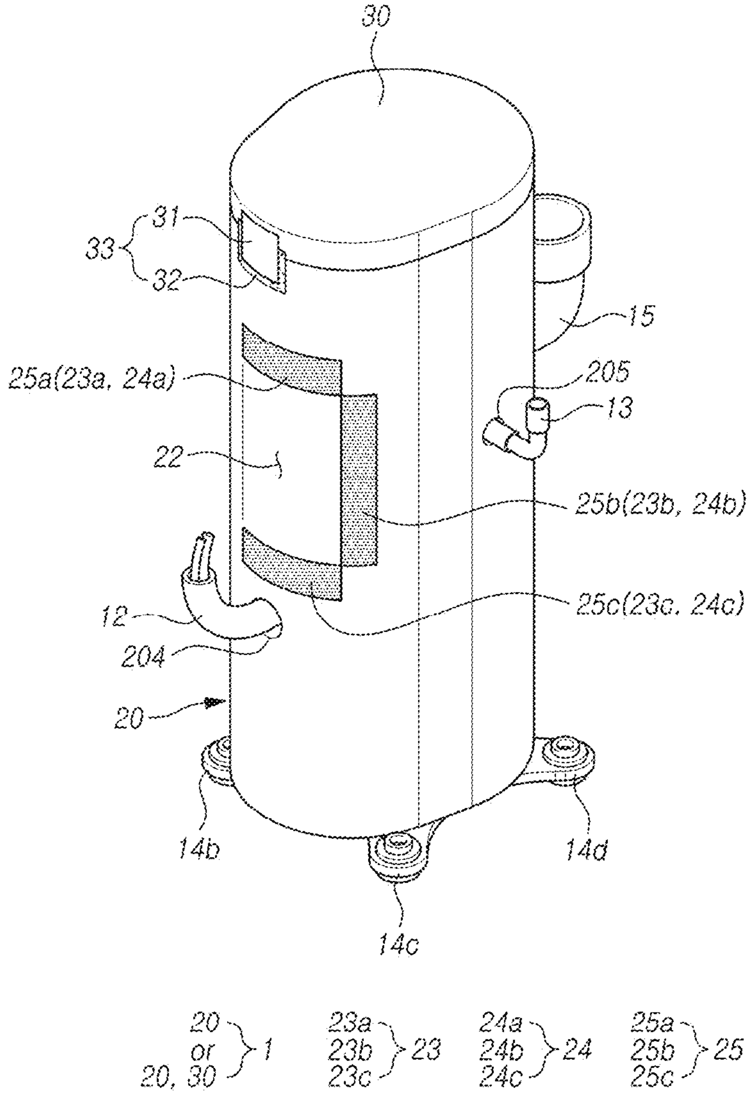
FIG. 2 is a perspective view illustrating an example noise blocking device in a state in which a terminal block cover felt is closed according to various embodiments.
Figure 3:
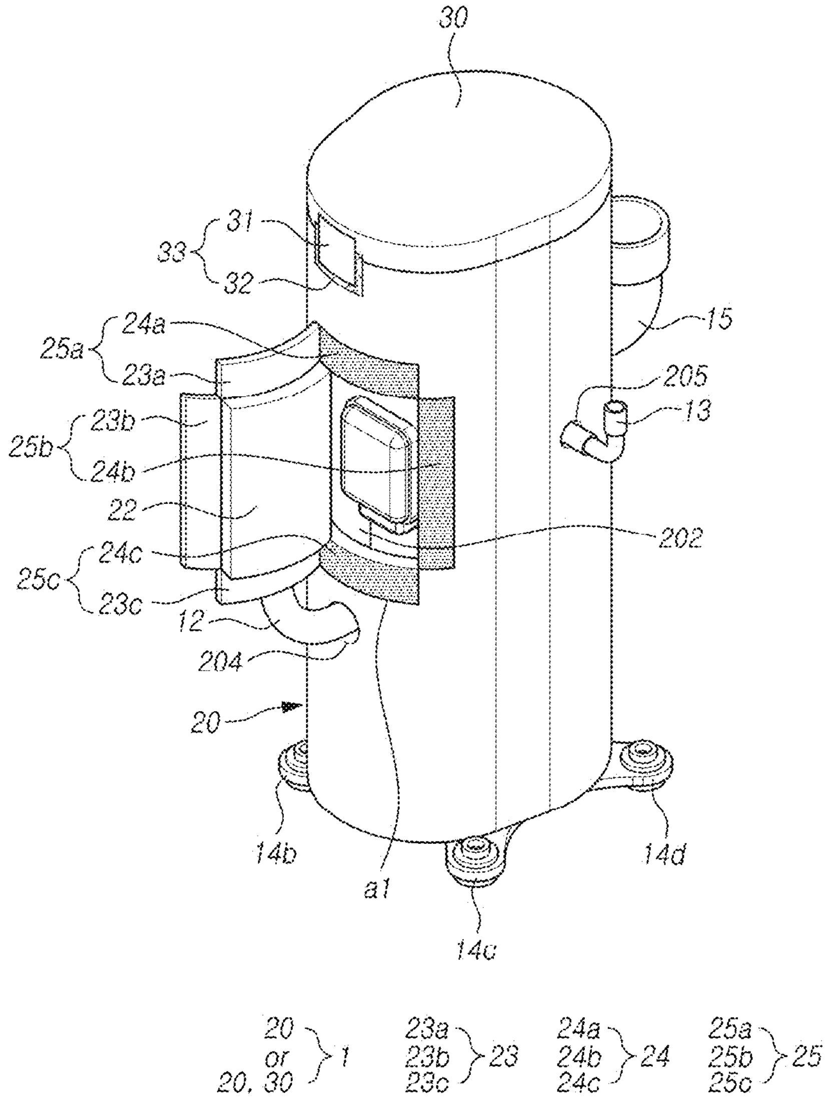
FIG. 3 is a perspective view illustrating an example noise blocking device in a state in which a terminal block cover felt is opened according to various embodiments.

FIG. 1 is a perspective view illustrating a compressor of an air conditioner according to various embodiments. FIG. 2 is a perspective view illustrating a noise blocking device in a state in which a terminal block cover felt is closed according to various embodiments. FIG. 3 is a perspective view illustrating a noise blocking device in a state in which a terminal block cover felt is opened according to various embodiments.

Referring to FIGS. 1, 2 and 3 (which may be referred to as FIGS. 1 to 3), an air conditioner according to an embodiment may include a compressor 10, a condenser (not shown), an expansion valve, or an evaporator in a cycle in which a refrigerant circulates. In order to compress the refrigerant at a high pressure, considerable noise and/or vibration may be generated in the compressor 10 including a component rotating at high speed.

The compressor 10 may be received in the noise blocking device 1 to block noise and/or vibration. The noise blocking device 1 may include a side felt 20, or may include a side felt 20 and an upper cover felt 30. According to an embodiment, the compressor 10 may be received in an inner space provided by the noise blocking device 1 formed of the side felt 20 in a standing type. In this case, the compressor 10 may be surrounded by the side felt 20 to be spatially isolated from the outside. The side felt 20 may be, e.g., a noise blocking housing disposed to surround the compressor 10 to spatially isolate the compressor 10 from the outside. According to an embodiment, the compressor 10 may be of a standing type and may be received in an inner space provided by the noise blocking device 1 including the side felt 20 and the upper cover felt 30. In this case, the compressor 10 may be surrounded by the side felt 20 and the upper cover felt 30 to be spatially isolated from the outside. The side felt 20 and the upper cover felt 30 may be, e.g., noise blocking housings disposed to surround the compressor 10 to spatially isolate the compressor 10 from the outside. FIG. 2 or 3 illustrates an example in which the noise blocking device 1 is provided by the side felt 20 and the upper cover felt 30, but the disclosure is not limited thereto, and the noise blocking device 1 may be provided only by the side felt 20.

According to an embodiment, a terminal block 11 may be disposed on the outer surface **10*a* of the compressor 10. The terminal block 11 may be disposed to protrude from the outer surface 10***a* of the compressor 10. In this case, the side felt 20 may include an opening 202 provided by three cut lines so that the terminal block 11 may be exposed to the outside. The terminal block 11 may face, e.g., the opening 202 in a short distance.

The side felt 20 may include a terminal block cover felt 22 for opening or closing part or whole of the opening 202 provided by the three cut lines. The terminal block cover felt 22 may be coupled to or separated from the side felt 20 using Velcro (or hook and loop fastener) 25. The terminal block cover felt 22 may open or close the opening 202 as a door function for opening or closing the opening 202.

The terminal block cover felt 22 may have an uncut left side nearby portion extending from the side felt 20, and may be attached to or removed from the side felt 20 by the Velcro portion 25. The terminal block cover felt 22 may close the opening 202 from the outside. According to an embodiment, the Velcro portion 25 coupling the side felt 20 and the terminal block cover felt 22 may be coupled by the first Velcro portion 25*a*, the second Velcro portion 25*b*, and the third Velcro portion 25*c* provided along the cut line forming the opening.

The first Velcro portion 25*a* may include a 1-1th Velcro 23*a* (e.g., male-type Velcro or hook-shaped male (M) Velcro) extending from the upper edge line of the terminal block cover felt 22 and a 1-2th Velcro 24*a* (e.g., female-type Velcro or loop-shaped female (F) Velcro) provided along the upper cut line of the opening 202. The second Velcro portion 25*b* may include a 2-1th Velcro 23*b* (e.g., male-type Velcro or hook-shaped male (M) Velcro) extending from the right edge line of the terminal block cover felt 22 and a 2-2th Velcro 24*b* (e.g., female-type Velcro or loop-shaped female (F) Velcro) provided along the right cut line of the opening 202. The third Velcro portion 25*c* may include a 3-1th Velcro 23*c* (e.g., male-type Velcro or hook-shaped male (M) Velcro) extending from the lower edge line of the terminal block cover felt 22 and a 3-2th Velcro 24*c* (e.g., female-type Velcro or loop-shaped female (F) Velcro) provided along the lower cut line of the opening 202.

As described above, the male-type Velcro or hook-shaped male (M) Velcro members 23*a*, 23*b*, and 23*c* may be attached to the terminal block cover felt 22 by stitching in the vicinity of the upper, right, and lower edge lines, and the female-type Velcro or loop-shaped female (F) Velcro members 24*a*, 24*b*, and 24*c* may be attached to the side felt 20 by stitching in the vicinity of the peripheral area al for providing the opening 202, e.g., in the vicinity of the upper, right, and lower cut lines. In this case, the terminal block cover felt 22 may open and close the opening 202 by moving in the left direction or the right direction with respect to the left end of the opening 202. Although not shown in the drawings, the terminal block cover felt 22 may be provided to open and close the opening 202 by moving in the right direction or the left direction with respect to the right end of the opening 202.

In the above-described example, it is assumed that the male-type or hook-shaped male (M) Velcro member is provided in the terminal block cover felt 22, and the female-type Velcro or loop-shaped female (F) Velcro member is provided in the vicinity of the peripheral area al of the opening 202 provided in the side felt 20 but, without limitations thereto, the female-type Velcro or loop-shaped female (F) Velcro member may be disposed in the terminal block cover felt 22, and the male-type or hook-shaped male (M) Velcro member may be disposed in the vicinity of the peripheral area al of the opening 202 provided in the side felt 20.

According to an embodiment, at least one cable hole 204 and/or at least one piping hole 205 may be formed in the side felt 20. The at least one cable hole 204 may be, e.g., a passage through which the cable 12 of the compressor 10 is to be drawn out of the side felt 20. The at least one piping hole 205 may be, e.g., a passage through which the pipes 13 and 15 of the compressor 10 are to be drawn out of the side felt 20. For example, at least one draw-out pipe 13 or at least one draw-in pipe 15 may be provided in the compressor 10.

According to an embodiment, the upper cover felt 30 may be coupled to the upper end of the side felt 20. The upper cover felt 30 may be detached or attached to the upper end of the side felt 20 by the Velcro 33. For example, the Velcro 33 may include the male-type or hook-shaped male (M) Velcro member 31 provided on the upper cover felt 30 and the female-type or loop-shaped female (F) Velcro member 32 provided on the side felt 20. As another example, the Velcro 33 may include the female-type or loop-shaped female (F) Velcro member 31 provided on the upper cover felt 30 and the male-type or hook-shaped male (M) Velcro member 31 provided on the side felt 20.

Figure 6:
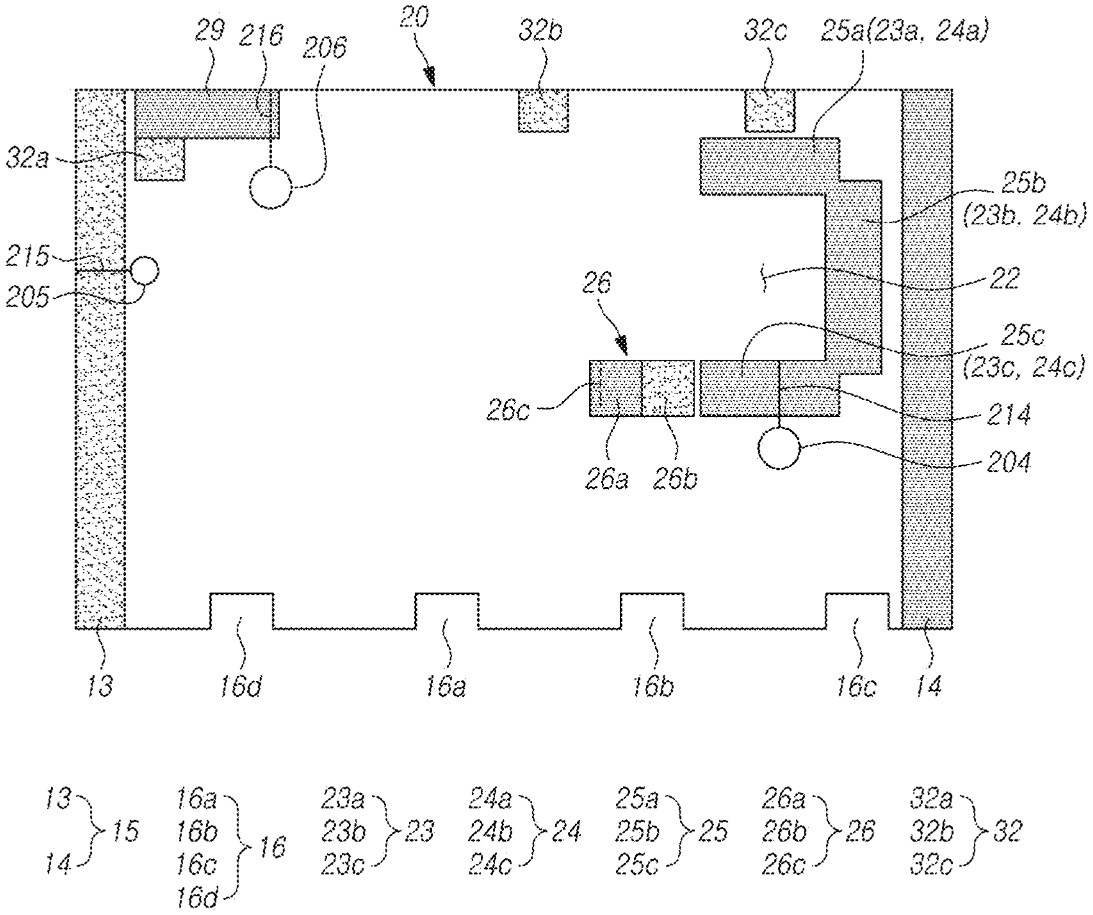
FIG. 6 is a diagram illustrating a front view of a side felt in a noise blocking device according to various embodiments.
Figure 7:
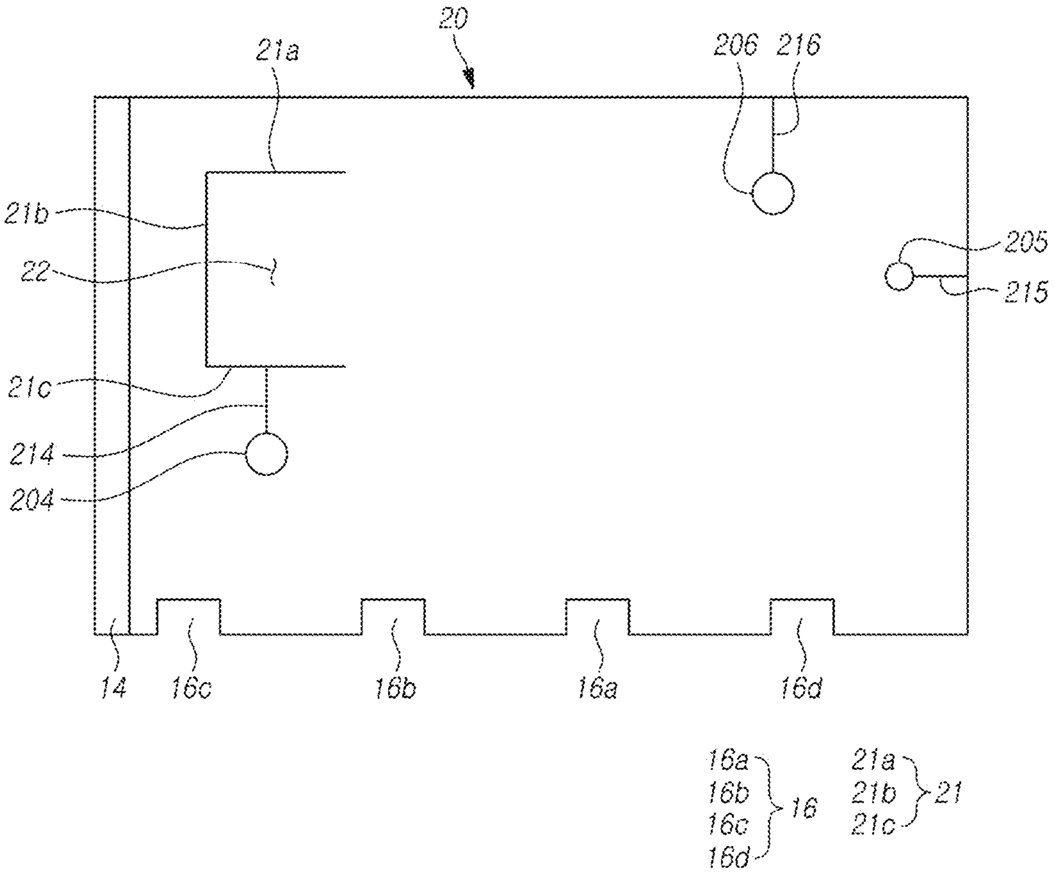
FIG. 7 is a diagram illustrating a rear view of a side felt in a noise blocking device according to various embodiments.

According to an embodiment, the side felt 20 may have, at a lower end, fitting portions (e.g., the first to fourth fitting portions 16*a*, 16*b*, 16*c*, and 16*d* of FIG. 6 or FIG. 7) considering the bottom supporting members 14*a*, 14*b*, 14*c*, and 14*d* provided to support the compressor 10 on the bottom. The fitting portions 16*a*, 16*b*, 16*c*, and 16*d* may have a shape in which the side felt 20 is dug to have a predetermined length along a lower edge line. The bottom supporting members 14*a*, 14*b*, 14*c*, and 14*d* provided in the compressor 10 may be fitted and fixed to the fitting portions 16*a*, 16*b*, 16*c*, and 16*d*.

Figure 4:
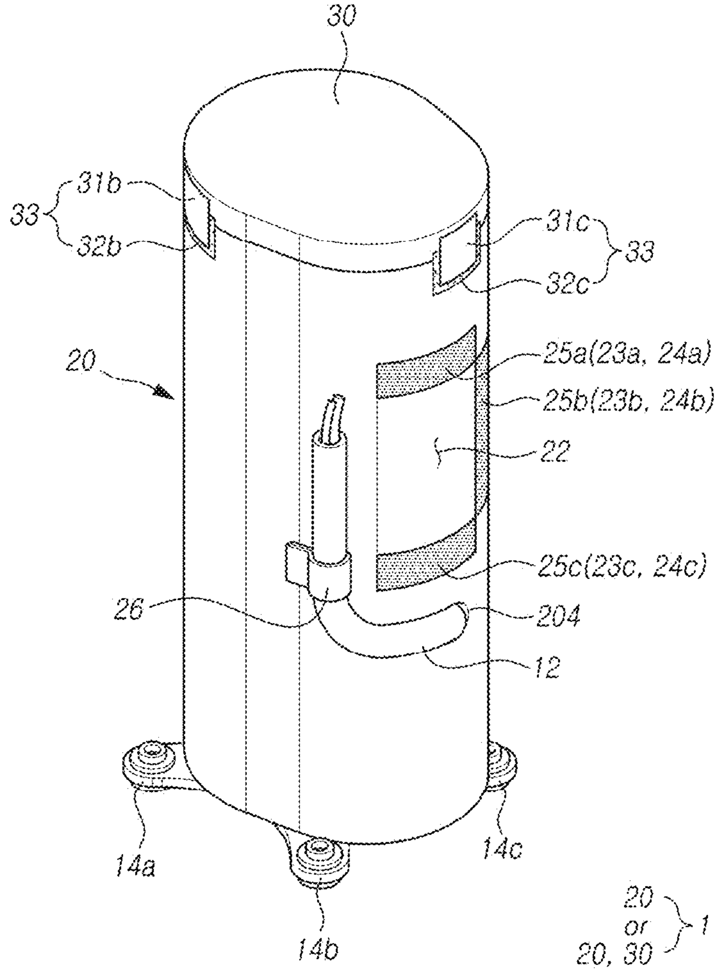
FIG. 4 is a perspective view illustrating a state in which a cable drawn out of a noise blocking device is fixed according to various embodiments.

FIG. 4 is a perspective view illustrating a state in which a cable drawn out of a noise blocking device is fixed according to various embodiments.

Referring to FIG. 4, the cable 12 drawn out through the cable hole 204 may be fixed to the side felt 20 by a cable fixing Velcro 26 provided around the opening 202 of the side felt 20. For example, one side (e.g., left side portion) of the cable fixing Velcro 26 may be formed of a male-type or hook-shaped male (M) Velcro member, and the other side (e.g., right side portion) may be formed of a female-type or loop-shaped female (F) Velcro member. One side end (e.g., left side end) of the cable fixing Velcro 26 may be fixed by stitching, and the other side may be open. In this case, the cable 12 may be fixed to the side felt 20 by surrounding the cable 12 using the open portion of the cable fixing Velcro 26 and then attaching it to the fixed portion.

Figure 5:
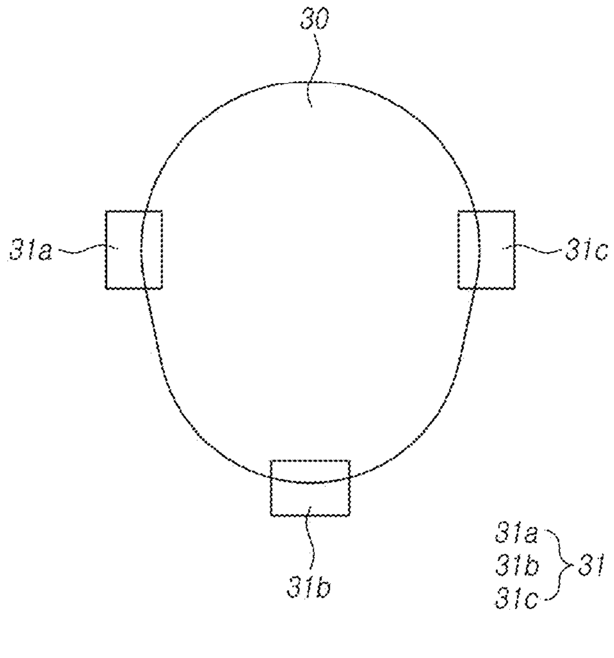
FIG. 5 is a diagram illustrating an example structure of upper cover felt in a noise blocking device according to various embodiments.

FIG. 5 is a diagram illustrating an example structure of upper cover felt in a noise blocking device according to various embodiments.

Referring to FIG. 5, at least one Velcro member 31*a*, 31*b*, and 31*c* may be fastened to the upper cover felt 30 according to an embodiment to be detached or attached to the upper end of the side felt 20. The at least one Velcro member 31*a*, 31*b*, and 31*c* may include, e.g., a first Velcro member 31*a* fastened to and extending from the front of the upper cover felt 30 by stitching, a second Velcro member 31*b* fastened to and extending from the left side of the upper cover felt 30 by stitching, and a third Velcro member 31*c* fastened to and extending from the right side of the upper cover felt 30 by stitching. For example, the first to third Velcro members 31*a*, 31*b*, and 31*c* may be male-type or hook-shaped male (M) Velcro members, or female-type or loop-shaped female (F)

Velcro members. In the drawings, three Velcro members 31*a*, 31*b*, and 31*c* are provided on the upper cover felt 30. However, the disclosure is not limited thereto, and more or less than three Velcro members may be provided.

FIG. 6 is a diagram illustrating a front view of a side felt in a noise blocking device according to various embodiments. FIG. 7 is a diagram illustrating a rear view of an example side felt in a noise blocking device according to various embodiments.

Referring to FIG. 6 and/or FIG. 7, the side felt 20 according to an embodiment may include a terminal block cover felt 22 to open and close an opening (e.g., the opening 202 of FIG. 3) for exposing a terminal block (e.g., the terminal block 11 of FIG. 1) provided in the compressor 10 to the outside when necessary. The terminal block cover felt 22 may be provided by, e.g., an upper cut line in the side felt 20, a lower cut line parallel to the upper cut line, and a right cut line connecting one side of the upper cut line and one side of the lower cut line. The other side of the upper cut line and the other side of the lower cut line may be connected to the side felt 20 without being cut.

The side felt 20 may include a plurality of Velcros 15, 23, 24, 25, 26, and 32. The plurality of Velcros 15, 23, 24, 25, 26, and 32 may include, e.g., a side felt fastening Velcro 15, a terminal block cover felt fastening Velcro 25, a cable fixing Velcro 26, a cut line fastening Velcro 29, or an upper cover felt fastening Velcro 32.

According to an embodiment, the side felt fastening Velcro portion 15 may be provided along two opposite edges of the side felt 20. The side felt fastening Velcro portion 15 may include, e.g., a first side felt fastening Velcro member 13 provided along a left edge of the side felt 20 and a second side felt fastening Velcro member 14 provided along a right edge of the side felt 20. The first side felt fastening Velcro member 13 may be a female-type or loop-shaped female (F) Velcro member, and the second side felt fastening Velcro member 14 may be a male-type or hook-shaped male (M) Velcro member, but without limitations thereto, vice versa may also be possible. By fastening the first side felt fastening Velcro member 13 and the second side felt fastening Velcro member 14, a space in which the compressor 10 is received may be provided.

According to an embodiment, the terminal block cover felt fastening Velcro 25 may be provided along an upper cut line, a right cut line, and a lower cut line for providing the terminal block cover 22. The terminal block cover felt fastening Velcro 25 may include, e.g., a first Velcro portion 25*a* corresponding to the upper terminal block cover felt fastening Velcro provided along the upper cut line, a second Velcro portion 25*b* corresponding to the right terminal block cover felt fastening Velcro provided along the right cut line, or a third Velcro portion 25*c* corresponding to the lower terminal block cover felt fastening Velcro provided along the lower cut line. The first Velcro portion 25*a*, the second Velcro portion 25*b*, or the third Velcro portion 25*c* may include a hook-shaped male (M) Velcro and a loop-shaped female (F) Velcro. The hook-shaped male (M) Velcro may be Velcros 23*a*, 23*b*, and 23*c* extending in the vicinity of the upper, right, or lower edge of the terminal block cover 22, and the hook-shaped female (F) Velcro may be Velcros 24*a*, 24*b*, and 24*c* disposed in the vicinity of the upper, right, or lower cut line in which the opening 202 is provided. However, the hook-shaped male (M) Velcro and the loop-shaped female (F) Velcro may be changed and disposed.

According to an embodiment, the cable fixing Velcro 26 may be provided around the cable hole 204. One side (e.g., the left portion) of the cable fixing Velcro 26 may be formed of a male-type or hook-shaped male (M) Velcro member 26*a*, and the other side (e.g., the right portion) of the cable fixing Velcro 26 may be formed of a female-type or loop-shaped female (F) Velcro member 26*b*. One end (e.g., the left end) of the cable fixing Velcro 26 may be fixed by the stitching 26*c*, and the other side may be open. The cable 12 may be fixed to the side felt 20 by wrapping the cable (e.g., the cable 12 of FIG. 2) drawn out through the cable hole 204 using the open portion of the cable fixing Velcro 26 and then attaching the male (M) Velcro member 26*a* provided in the open portion to the female (F) Velcro member 26*b* provided in the fixed portion.

According to an embodiment, one side of the cut line fastening Velcro 29 may be attached to one Velcro 32*a* of the upper cover felt fastening Velcro 32, and the other side of the cut line fastening Velcro 29 may be attached to cover the cut line 216 cutting from the draw-in piping hole 206 to the upper edge of the side felt 20. The cut line fastening Velcro 29 may be disposed, e.g., along an upper edge line of the side felt 20.

According to an embodiment, the upper cover felt fastening Velcro 32 may be provided near the upper edge of the side felt 20. The upper cover felt fastening Velcro 32 may include, e.g., three Velcro members 32*a*, 32*b*, and 32*c* disposed near the left, middle, or right sides at regular intervals along the upper edge line of the side felt 20. The three Velcro members 32*a*, 32*b*, and 32*c* included in the upper cover felt fastening Velcro 32 may be fastened to the Velcro members 31*a*, 31*b*, and 31*c* provided in the upper cover felt 30 when the upper cover felt 30 is mounted.

According to an embodiment, a plurality of holes 204, 205, and 206 may be provided in the side felt 20. The plurality of holes 204, 205, and 206 may include, e.g., a cable hole 204 that is a passage through which the cable 12 provided in the compressor 10 is drawn out to the outside, a draw-out piping hole 205 that is a passage through which the draw-out pipe 13 provided in the compressor 10 is drawn out to the outside, or an draw-in piping hole 206 that is a passage through which the draw-in pipe 15 provided in the compressor 10 is drawn out to the outside. The cable hole 204 may be provided near the lower end of the terminal block cover felt 22. Lower ends of the cable hole 204 and the terminal block cover felt 22 may be cut along the first cut line 214. The first cut line 214 is provided to facilitate withdrawal of the cable 12 to the outside. The draw-out piping hole 205 may be provided at any position at the left end facing the draw-out pipe 13 provided in the compressor 10 when the compressor 10 is received in the noise blocking device 1. The draw-out piping hole 205 and the left edge of the side felt 20 may be cut along the second cut line 215. The second cut line 215 is provided to facilitate withdrawal of the draw-out pipe 13 provided in the compressor 10 to the outside. The draw-in piping hole 206 may be provided at any position of the side felt 20 facing the draw-in pipe 15 provided in the compressor 10 when the compressor 10 is received in the noise blocking device 1. The draw-in piping hole 206 and the upper edge of the side felt 20 may be cut along the third cut line 216. The third cut line 216 is provided to facilitate the insertion of the draw-in pipe 15 drawn in to be connected to the compressor 10 from the outside.

According to an embodiment, a fitting portion 16 may be provided near an upper edge of the side felt 20 in consideration of bottom supporting members (e.g., the bottom supporting members 14*a*, 14*b*, 14*c*, and 14*d* of FIG. 2) provided to support the compressor 10 on the bottom. The fitting portion 16 may include, e.g., four fitting grooves 16*a*, 16*b*, 16*c*, and 16*d*. The four fitting grooves 16*a*, 16*b*, 16*c*, and 16*d* may be dug to have a predetermined depth at predetermined intervals along the lower edge line of the side felt 20. The bottom supporting members 14*a*, 14*b*, 14*c*, and 14*d* provided in the compressor 10 may be fitted and fixed to the fitting grooves 16*a*, 16*b*, 16*c*, and 16*d*.

Figure 8:
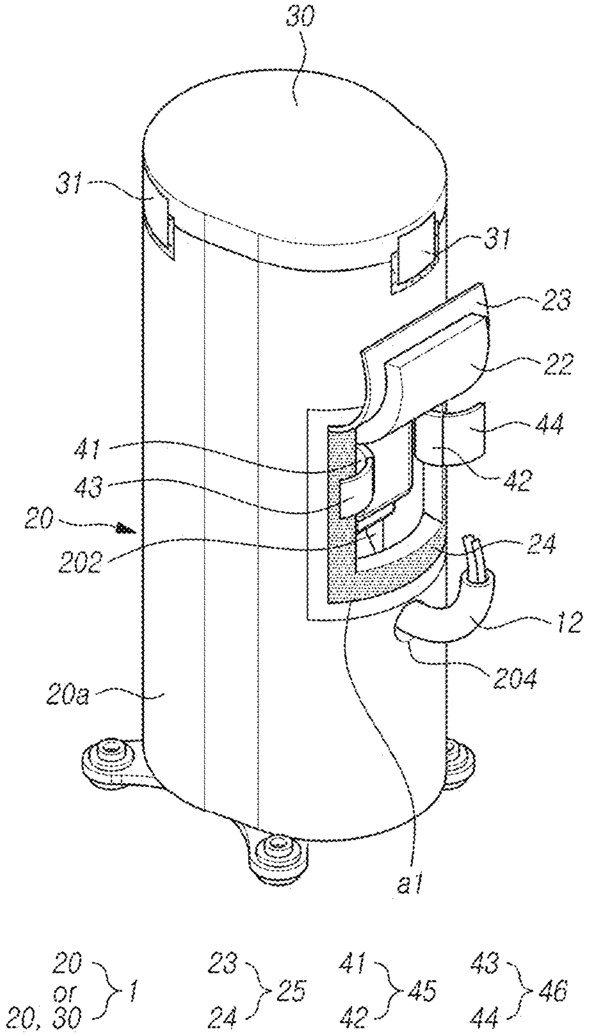
FIG. 8 is a perspective view illustrating a noise blocking device in which a holding device is not fastened in an opened state of a terminal block cover felt according to various embodiments.
Figure 9:
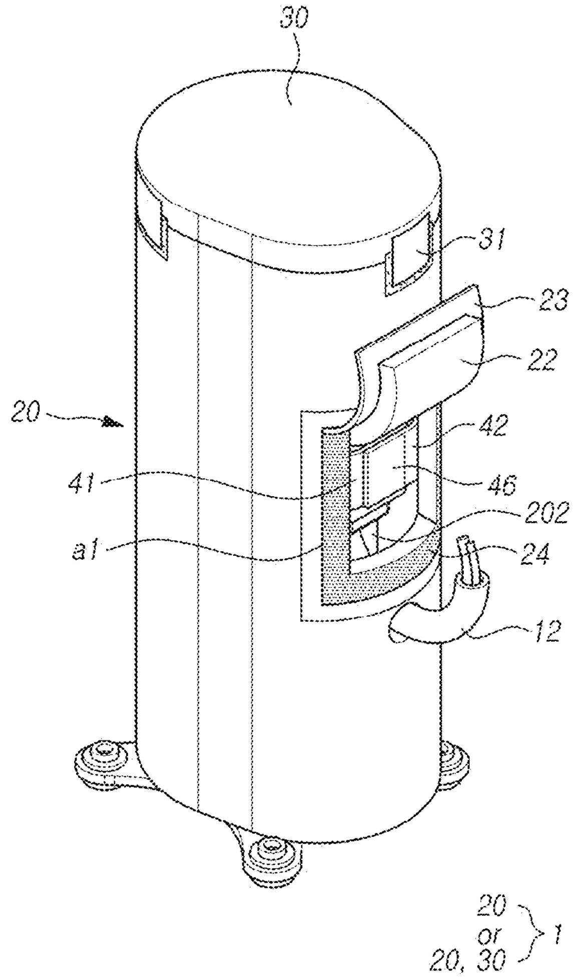
FIG. 9 is a perspective view illustrating a noise blocking device in which a holding device is fastened in an opened state of a terminal block cover felt according to various embodiments.
Figure 10:
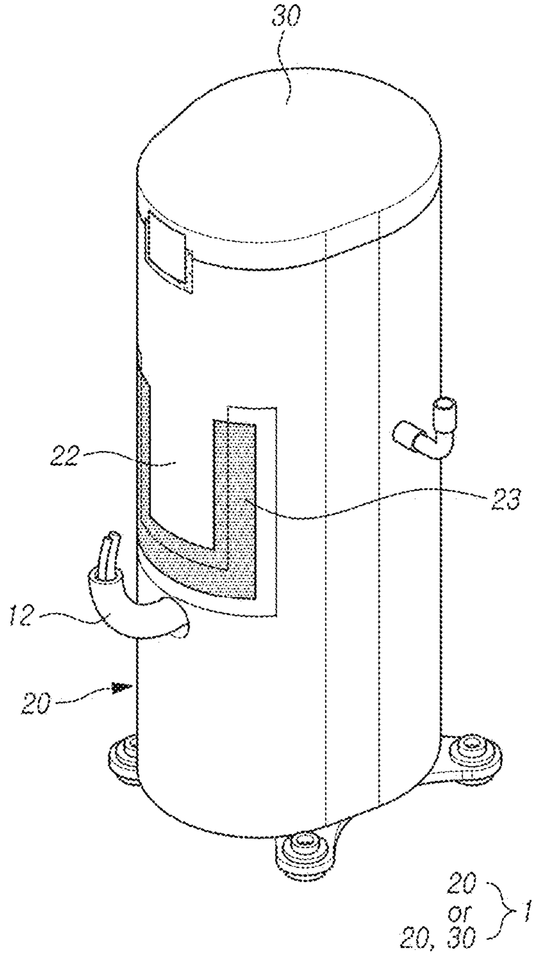
FIG. 10 is a perspective view illustrating a noise blocking device in a state in which a terminal block cover felt is closed according to various embodiments.

FIG. 8 is a perspective view illustrating a noise blocking device in which a holding device is not fastened in an opened state of a terminal block cover felt according to various embodiments. FIG. 9 is a perspective view illustrating a noise blocking device in which a holding device is fastened in an opened state of a terminal block cover felt according to various embodiments. FIG. 10 is a perspective view illustrating a noise blocking device in a state in which a terminal block cover felt is closed according to various embodiments.

Referring to FIGS. 8, 9 and 10 (which may be referred to as FIGS. 8 to 10), an air conditioner according to an embodiment may include a compressor 10, a condenser (not shown), an expansion valve, or an evaporator in a cycle in which a refrigerant circulates. By having a component rotating at high speed to compress the refrigerant at a high pressure, the compressor 10 may generate considerable noise and/or vibration.

According to an embodiment, the compressor 10 may dispose the side felt 20 to block noise and/or vibration. The compressor 10 may be, e.g., of a standing type and may be received in an inner space provided by the side felt 20, may be surrounded by the side felt 20, and may be spatially isolated from the outside by the side felt 20. According to an embodiment, the side felt 20 may be, e.g., a noise blocking housing disposed to surround the compressor 10 to spatially isolate the compressor 10 from the outside.

According to an embodiment, the compressor 10 may have a terminal block 11 disposed on the outer surface 10*a*, and the terminal block 11 may be disposed to protrude from the outer surface 10*a*. In this case, the side felt 20 may include an opening 202 formed to allow the terminal block 11 to be exposed to the outside. The terminal block 11 may face, e.g., the opening 202 in a short distance.

According to an embodiment, the side felt 20 may include a terminal block cover felt 22 for opening or closing part or whole of the opening 202. The terminal block cover felt 22 may have a shape extending from, e.g., the side felt 20 around the opening 202 and may be coupled to the area al around the opening using Velcro. The terminal block cover felt 22 may close the opening 202 from the outside.

According to an embodiment, the terminal block cover felt 22 may open or close the opening 202 by moving upward or downward with respect to the upper end of the opening 202. Although not illustrated, the terminal block cover felt 22 may open or close the opening 202 by moving upward or downward with respect to the lower end of the opening 202, or may open or close the opening 202 by moving left or right with respect to the left end of the opening 202 or the right end of the opening 202.

According to an embodiment, it may be difficult to maintain the original shape of the side felt 20 that facilitates to block the noise and/or vibration of the compressor 10 received in the inner space. To address this, the side felt 20 according to an embodiment may include a holding device 45. According to an embodiment, the holding device 45 is a structure that provides a force for maintaining the original shape of the side felt 20, and may be disposed in an inner belt type. Hereinafter, the holding device 45 will be referred to as an inner belt 45.

According to an embodiment, the inner belt 45 may be disposed in the opening peripheral area al to provide a force for maintaining the shape of the side felt 20. The inner belt 45 may be disposed, e.g., on the inner surface of the side felt 20 in the opening peripheral area al, and may be positioned between the terminal block 11 and the opening 202. One end of the inner belt 45 may be a fixed end that is fixed to the opening peripheral area al, and the other end may be a free end.

According to an embodiment, the inner belt 45 may include first or second inner belts 41 and 42. The first inner belt 41 may be disposed, e.g., on one side of the opening peripheral area al, and the second inner belt 42 may be disposed, e.g., on the other side of the opening peripheral area al. The second inner belt 42 may be connected to or separated from the first inner belt 41 by an attaching/detaching device 46. For example, the first inner belt 41 may be disposed on the left side of the opening 202, and the second inner belt 42 may be disposed on the right side of the opening 202. Although not illustrated, the first inner belt 41 may be disposed above the opening 202, and the second inner belt 42 may be disposed below the opening 202.

According to an embodiment, the attaching/detaching device 46 may include Velcro (or hook and loop fastener). Hereinafter, the attaching/detaching device 46 will be referred to as a 'Velcro'.

According to an embodiment, the respective ends of the first or second inner belts 41 and 42 may be coupled or separated using Velcro 46. For example, one end of the first inner belt 41 may be fixed to one side of the opening peripheral area al, and the other end of the first inner belt 41 may be a free end. A first Velcro 43 may be disposed at an end of a free end corresponding to the other end provided in the first inner belt 41. For example, one end of the second inner belt 42 may be fixed to the other side of the opening peripheral area al, and the other end of the second inner belt 42 may be a free end. A second Velcro 44 may be disposed at an end of a free end corresponding to the other end provided in the second inner belt 42. For example, the first Velcro 43 may be a male-type Velcro and the second Velcro 44 may be a female-type Velcro, or the first Velcro 43 may be a female-type Velcro and the second Velcro 44 may be a male-type Velcro.

According to an embodiment, the first inner belt 41 and the second inner belt 42 may be integrally connected by coupling of the first Velcro 43 and the second Velcro 43 and 44. The holding force that the inner belt 45 may provide may be adjusted by a coupling position between the first Velcro 43 and the second Velcro 44.

According to an embodiment, the inner belt 45 may be formed of any one of a fabric material, a metal material, or a synthetic resin material.

According to an embodiment, the terminal block cover felt 22 may be coupled to or separated from the side felt 20 using the Velcro 25. The terminal block cover felt 22 may close the opening 202, e.g., as a door function for opening or closing the opening 202.

According to an embodiment, the Velcro 25 used to open and close the terminal block cover felt 22 may include a first Velcro 23 or a second Velcro 24. According to an embodiment, the first Velcro 23 may be disposed along an edge portion of the terminal block cover felt 22, and the second Velcro 24 may be disposed around the opening 202 in the outer surface of the side felt 20. For example, the first Velcro 23 may be a male-type Velcro and the second Velcro 24 may be a female-type Velcro, or the first Velcro 23 may be a female-type Velcro and the second Velcro 24 may be a male-type Velcro. The terminal block cover felt 22 may close the opening 202 by coupling of the first Velcro 23 and the second Velcro 24.

According to an embodiment, at least one cable hole 204 may be formed in the side felt 20. The cable hole 204 may be, e.g., a passage through which the cable 12 of the compressor 10 is to be drawn out of the side felt 20.

According to an embodiment, the upper cover felt 30 may be coupled to the upper end of the side felt 20. The upper cover felt 30 may be detached or attached to the upper end of the side felt 20 by, e.g., the Velcro 31.

Figure 11A:
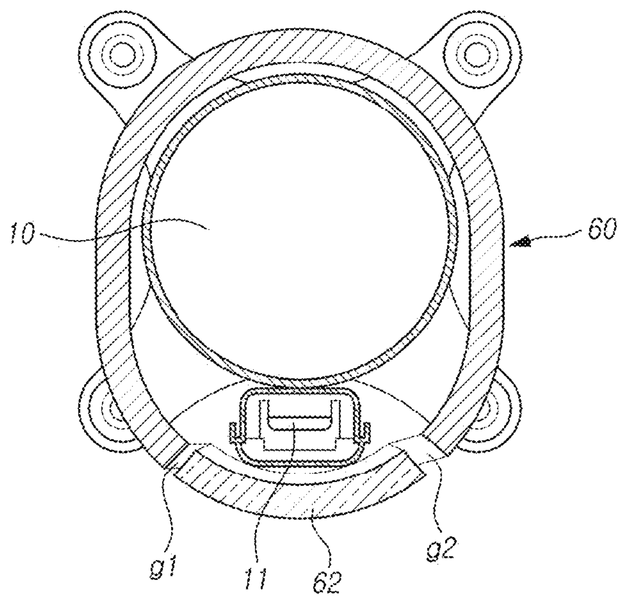
FIG. 11A is a cross-sectional view including a top view illustrating a state in which a gap is formed between an opening and terminal block cover felt in a noise blocking device where a compressor is received according to various embodiments.
Figure 11B:
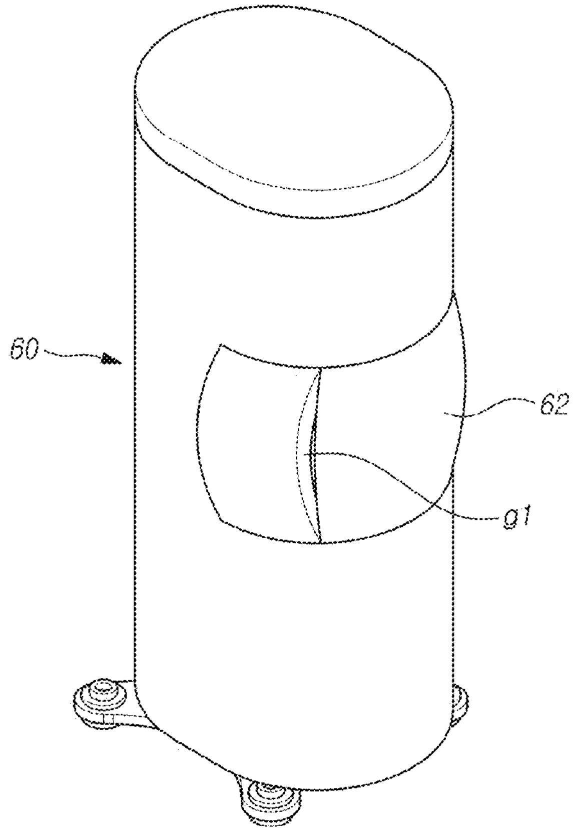
FIG. 11B is a perspective view illustrating a state in which a gap is formed between an opening and terminal block cover felt in a noise blocking device where a compressor is received according to various embodiments.

FIG. 11A is a cross-sectional view including a top view illustrating a state in which a gap is formed between an opening and terminal block cover felt in a noise blocking device where a compressor is received according to various embodiments. FIG. 11B is a perspective view illustrating a state in which a gap is formed between an opening and terminal block cover felt in a noise blocking device where a compressor is received according to various embodiments.

Referring to FIGS. 11A and 11B, when gaps g1 and g2 are generated between the opening of the side felt 60 and the terminal cover felt 62, noise generated from the compressor 10 may leak through the gaps g1 and g2.

Figure 12A:
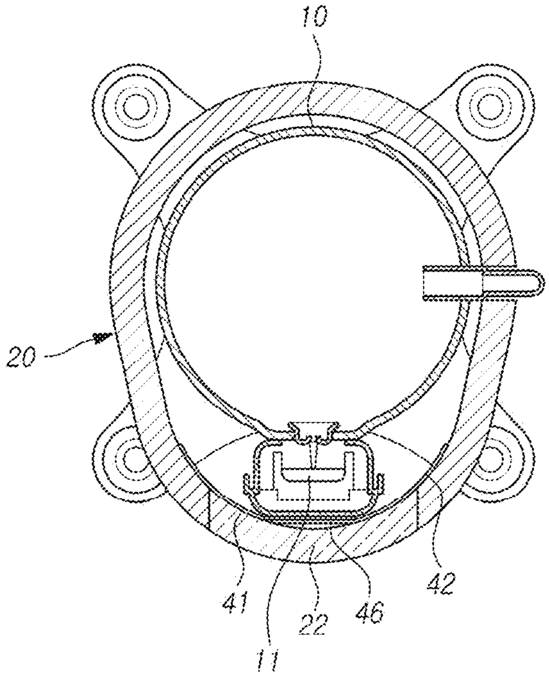
FIG. 12A is a cross-sectional view including a top view illustrating a state in which a gap between an opening and terminal block cover felt is removed due to a holding device provided in a noise blocking device where a compressor is received according to various embodiments.
Figure 12B:
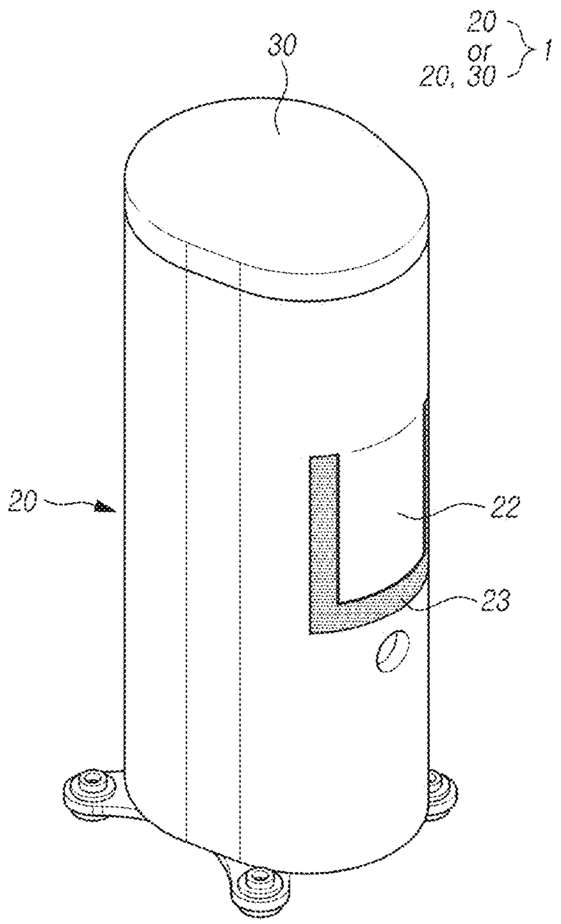
FIG. 12B is a perspective view illustrating a state in which a gap between an opening and terminal block cover felt is removed due to a holding device provided in a noise blocking device where a compressor is received according to various embodiments.

FIG. 12A is a cross-sectional view including a top view illustrating a state in which a gap between an opening and terminal block cover felt is removed due to a holding device provided in a noise blocking device where a compressor is received according to various embodiments. FIG. 12B is a perspective view illustrating a state in which a gap between an opening and terminal block cover felt is removed due to a holding device provided in a noise blocking device where a compressor is received according to various embodiments.

Referring to FIGS. 12A and 12B, it may be identified that in the air conditioner according to an embodiment, as the first and second inner belts 41 and 42 are connected by the attaching/detaching device 46, the gap between the opening 202 of the side felt 20 and the terminal cover felt 22 is removed, thereby preventing/reducing external leakage of noise generated from the compressor 10.

Figure 13:
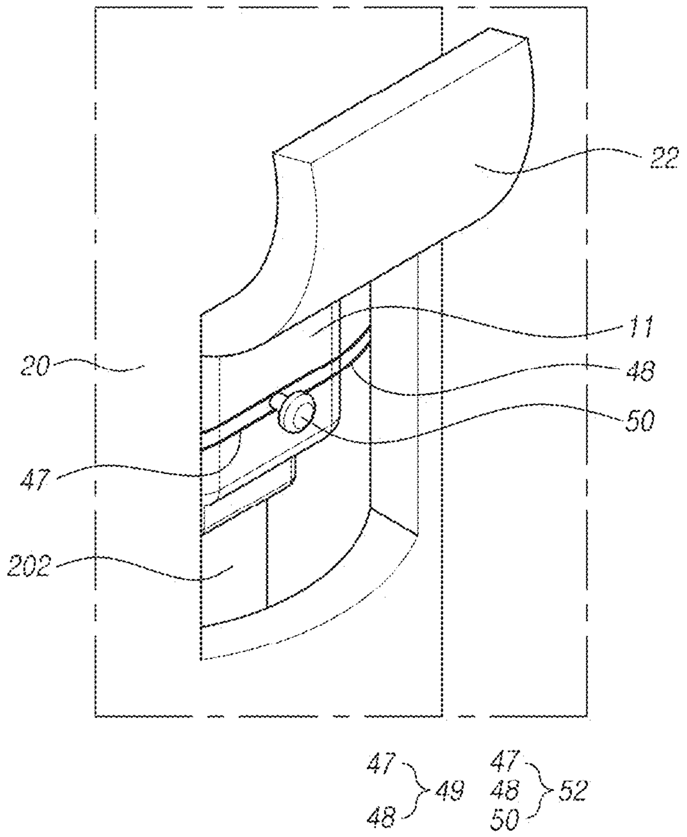
FIG. 13 is a partial perspective view illustrating a portion near an opening in a noise blocking device having a holding device according to various embodiments.
Figure 14:
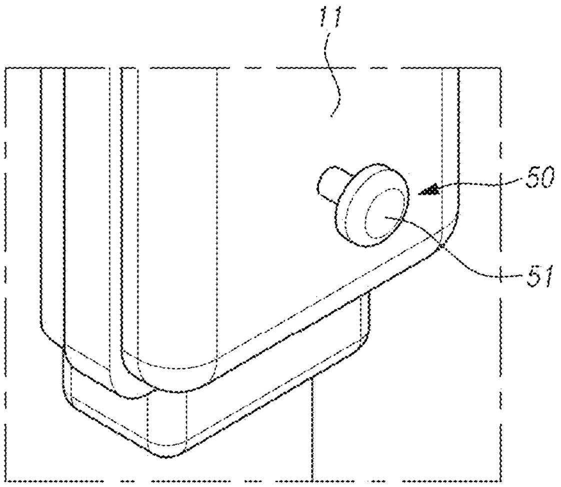
FIG. 14 is an enlarged partial perspective view illustrating a stop protrusion of FIG. 13 according to various embodiments.

FIG. 13 is a partial perspective view illustrating a portion near an opening in a noise blocking device having a holding device according to various embodiments. FIG. 14 is an enlarged view illustrating the stop protrusion of FIG. 13 according to various embodiments.

Referring to FIGS. 13 and 14, the holding device of the side felt 20 may be disposed in a wire belt type. Hereinafter, the holding device will be referred to as a 'wire belt 52'.

According to an embodiment, the wire belt 52 may include at least one stop protrusion 50 and at least one wire 49. The stop protrusion 50 may be formed, e.g., on an outer surface that is a front portion of the terminal block 11. The stop protrusion 50 may have a shape protruding toward the opening 202 and may include a stopping shape. The wire 49 may include, e.g., at least one wire 47 or 48 having one end fixed to the opening peripheral area al and the other end stuck to the stop protrusion 50. The wire 49 may include a first or second wire 47 and 48. The first wire 47 may be disposed, e.g., on one side (e.g., the left side) of the opening 202, and the second wire 48 may be disposed, e.g., on the other side (e.g., the right side) of the opening 202. One end of the first wire 47 may be fixed to the opening peripheral area al, and the other end of the first wire 47 may be stuck to the stop protrusion 50. One end of the second wire 48 may be fixed to the opening peripheral area al, and the other end of the second wire 48 may be stuck to the stop protrusion 50. A stop head 51 may be formed at an end of the stop protrusion 50. The stop head 51 may prevent and/or reduce the first or second wires 47 and 48 from escaping off the stop protrusion 50.

According to an embodiment, in a state in which the first or second wire 47 and 48 is stuck to the stop protrusion 50, the first or second wire 47 and 48 may have a predetermined tension.

Figure 15A:
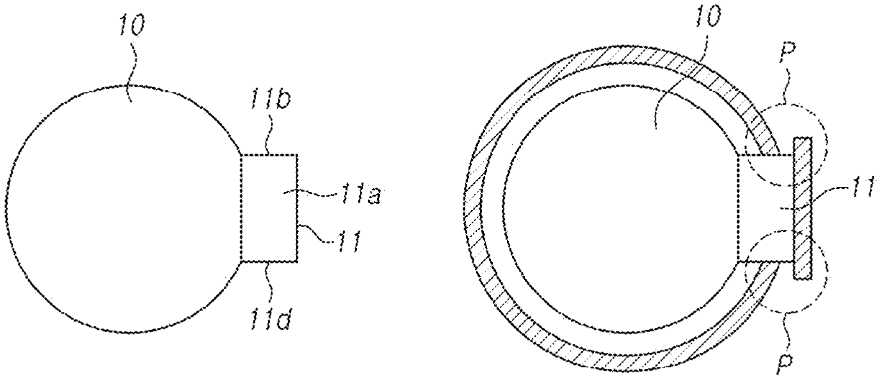
FIG. 15A is a diagram illustrating a plan view of an example of a discontinuous structure of side felt by a terminal block provided on an outer surface of a compressor according to various embodiments.

FIG. 15A is a diagram illustrating a plan view of an example of a discontinuous structure of side felt by a terminal block provided on an outer surface of a compressor according to various embodiments.

Referring to FIG. 15A, according to an embodiment, the terminal block 11 may be disposed to protrude from the outer circumferential surface 10*a* of the compressor 10. In this case, the terminal block 11 may be disposed so that the first to fourth side surfaces or outer surfaces thereof are exposed from the outer circumferential surface.

According to an embodiment, if the side felt 27 surrounding the compressor 10 where the terminal block 11 is disposed is disposed, at least one discontinuous point p of the side felt 27 may be generated. The noise caused by the operation of the compressor 10 may be leaked by the discontinuous point p of the side felt 27, and may be emitted to the outside. In this case, the side felt 27 may need a felt having a separate structure.

Figure 15B:
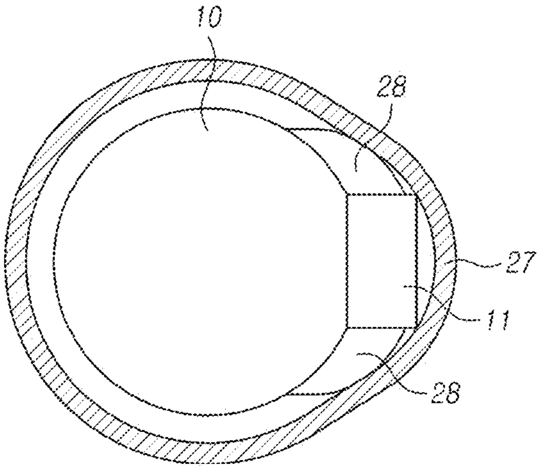
FIG. 15B is a diagram illustrating a plan view of a state in which a noise leakage blocking part is disposed along a terminal periphery area provided in an outer surface of a compressor according to various embodiments.

FIG. 15B is a diagram illustrating a plan view of a state in which a noise leakage blocking part is disposed along a terminal periphery area provided in an outer surface of a compressor according to various embodiments.

Referring to FIG. 15B, at least one noise leakage blocking part 28 may be disposed to block noise leakage caused by the discontinuous point p of the side felt 27.

According to an embodiment, the noise leakage blocking part 28 may be disposed between the outer circumferential surface 10*a* of the compressor 10 and one side surface of the side felt 27 or the terminal block, thereby minimizing/reducing noise leakage. The terminal block 11 may include, e.g., first to fourth side surfaces 11 or an outer surface Ile surrounded by the first to fourth side surfaces 11. The noise leakage blocking part 28 may be disposed to be in tight contact with a space between at least one side surface of the terminal block 11 and the side felt 27. For example, the noise leakage blocking part 28 may be disposed or fill at least a partial space between one terminal block side surface, two terminal block side surfaces, three terminal block side surfaces, or four terminal block side surfaces and the side felt 27. In particular, the noise leakage blocking part 28 may be disposed to be in tight contact with at least a portion of the outer surface and/or one or more terminal block side surfaces and side felts.

According to an embodiment, the noise leakage blocking part 28 may be disposed to be attached to the outer circumferential surface 10*a* of the compressor 10. The noise leakage blocking part 28 may be formed of an elastic material. For example, the noise leakage blocking part 28 may be formed of a material such as a sponge formed of a foam resin material.

According to an embodiment, at least a partial outer surface of the noise leakage blocking part 28 may be in tight contact with a partial surface of the side felt 27, and may be disposed to be in tight contact with one or more side surfaces of the terminal block 11. The noise leakage blocking part 28 may be disposed in a compressed state between at least one side surface 11 of the terminal block 11 and the side felt 27.

Hereinafter, various example embodiments of the noise leakage blocking part 28 are described in greater detail.

Figure 16A:
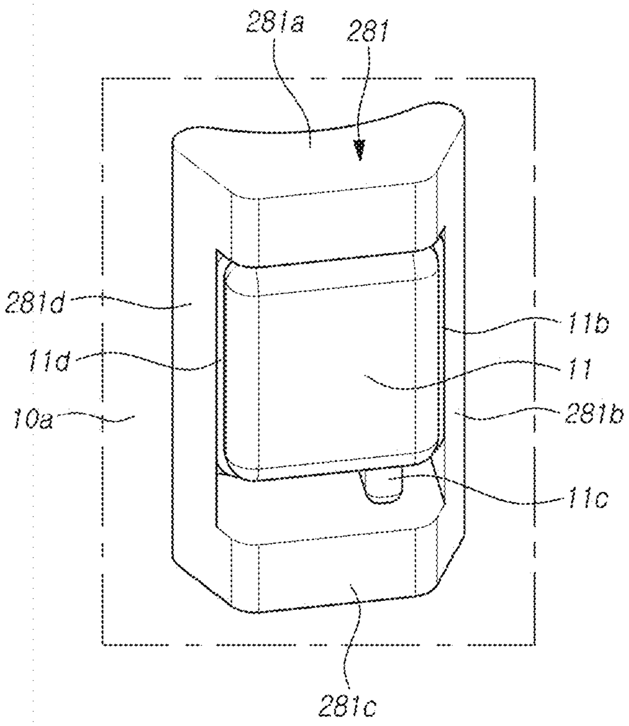
FIG. 16A is an enlarged perspective view illustrating a noise leakage blocking part disposed in a surrounding area of a terminal block provided in an outer surface of a compressor according to various embodiments.
Figure 16B:
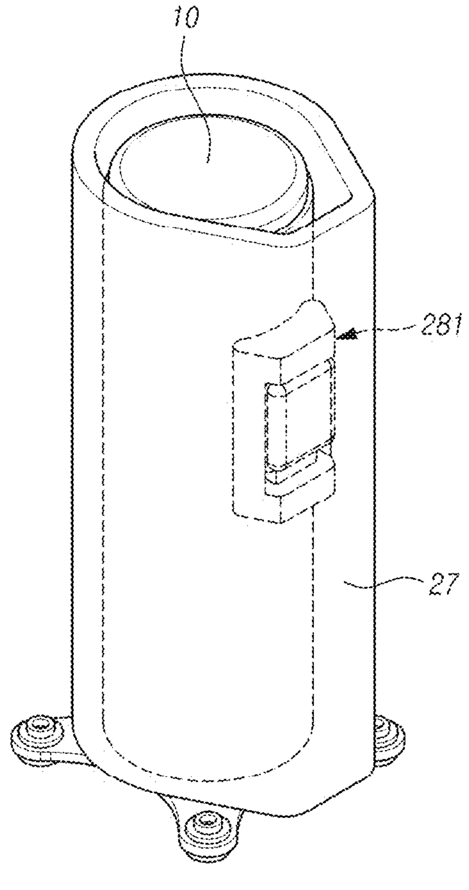
FIG. 16B is a perspective view illustrating a state of disposition of a noise leakage blocking part disposed in a surrounding area of a terminal block provided in an outer surface of a compressor according to various embodiments.
Figure 16C:
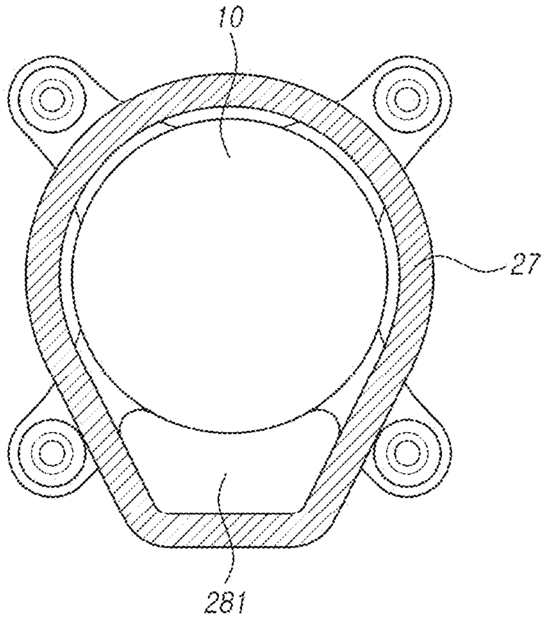
FIG. 16C is a diagram illustrating a plan view of a state of disposition of a noise leakage blocking part disposed in a surrounding area of a terminal block provided in an outer surface of a compressor according to various embodiments.

FIG. 16A is an enlarged perspective view illustrating a noise leakage blocking part disposed in a surrounding area of a terminal block provided in an outer surface of a compressor according to various embodiments. FIG. 16B is a perspective view illustrating a state of disposition of a noise leakage blocking part disposed in a surrounding area of a terminal block provided in an outer surface of a compressor according to various embodiments. FIG. 16C is a diagram illustrating a plan view of a state of disposition of a noise leakage blocking part disposed in a surrounding area of a terminal block provided in an outer surface of a compressor according to various embodiments.

Referring to FIGS. 16A, 16B and 16C (which may be referred to as FIGS. 16A to 16C), the noise leakage blocking part 281 according to an embodiment may be disposed between the first to fourth side surfaces 11*a* to 11*d* of the terminal block 11 and the side felt 27. The noise leakage blocking part 281 may be disposed, e.g., between the first to fourth side surfaces 11*a* to 11*d* and the side felt 27. The noise leakage blocking part 281 may have a shape surrounding all of the first to fourth side surfaces 11*a* to 11*d* of the terminal block 11. For example, when the noise leakage blocking part 281 is viewed from the front, it may be substantially rectangular.

According to an embodiment, the noise leakage blocking part 281 may include first to fourth portions 281*a* to 281*d*. The first portion 281*a* may face the first side surface 11*a*, the second portion 281*b* may face the second side surface 11*b*, the third portion 281*c* may face the third side surface 11*c*, and the fourth portion 281*d* may face the fourth side surface 11*d*. In the noise leakage blocking part 281, the third side surface 11*c* of the terminal block 11 and the third portion 281*c* may be spaced apart from each other, and a space may be formed between the third side surface 11*c* and the third portion 281*c* according to the spaced-apart structure.

According to an embodiment, if the compressor 10 operates, noise generated by the compressor 10 may be primarily minimized and/or reduced by the first to second portions 281*a* to 281*d* of the noise leakage blocking portion 281.

Figure 17A:
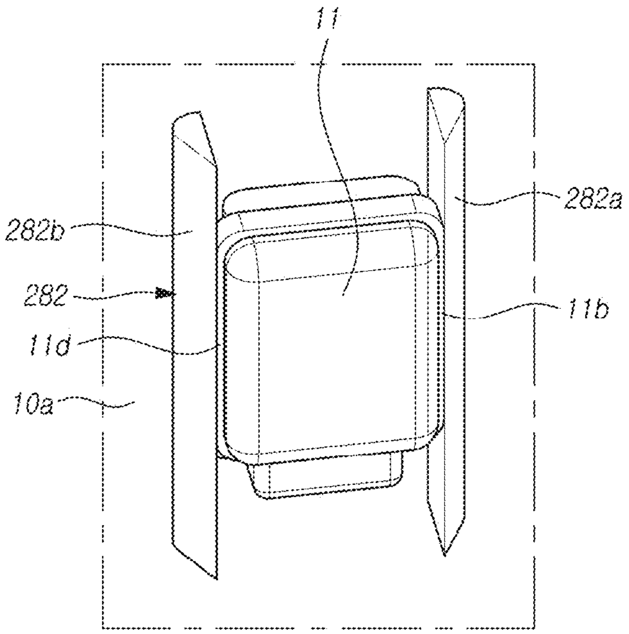
FIG. 17A is an enlarged perspective view illustrating a noise leakage blocking part disposed in a surrounding area of a terminal block provided in an outer surface of a compressor according to various embodiments.
Figure 17B:
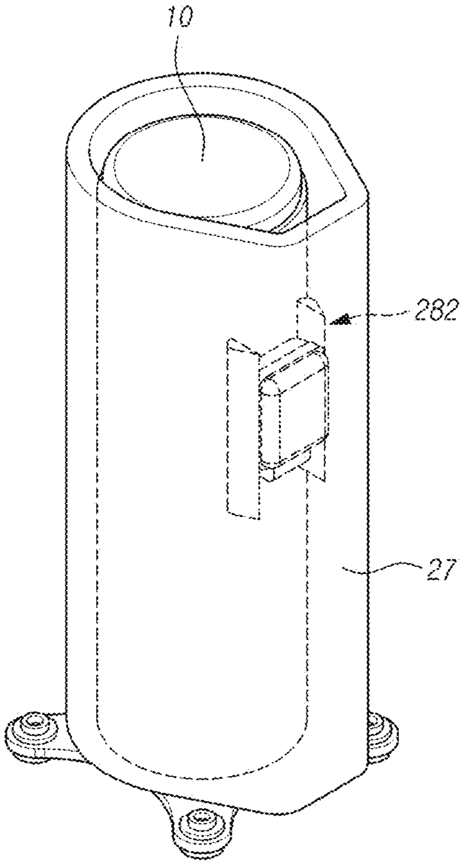
FIG. 17B is a perspective view illustrating a state of disposition of a noise leakage blocking part disposed in a surrounding area of a terminal block provided in an outer surface of a compressor according to various embodiments.

FIG. 17A is an enlarged perspective view illustrating a noise leakage blocking part disposed in a surrounding area of a terminal block provided in an outer surface of a compressor according to various embodiments. FIG. 17B is a perspective view illustrating a state of disposition of a noise leakage blocking part disposed in a surrounding area of a terminal block provided in an outer surface of a compressor according to various embodiments.

Referring to FIGS. 17A and 17B, the noise leakage blocking part 282 according to an embodiment may be disposed between the second and fourth side surfaces 11*b* and 11*d* of the terminal block 11 and the side felt 27. The noise leakage blocking portion 282 may include, e.g., a first portion 282*a* extending along the second side surface 11*b* and a second portion 282*b* extending along the fourth side surface 11*d*. The first and second portions 282*a* and 282*b* may face each other and may face each other with respect to the terminal block 11. For example, the first and second portions 282*a* and 282*b* each may extend in a vertical direction and may have linear shapes. The shapes of the first and second portions 282*a* and 282*b* are not necessarily limited to a linear shape.

According to an embodiment, if the compressor 10 operates, noise generated by the compressor 10 may be primarily minimized and/or reduce by the first and second portions 282*a* and 282*b* of the noise leakage blocking part 282.

Figure 18A:
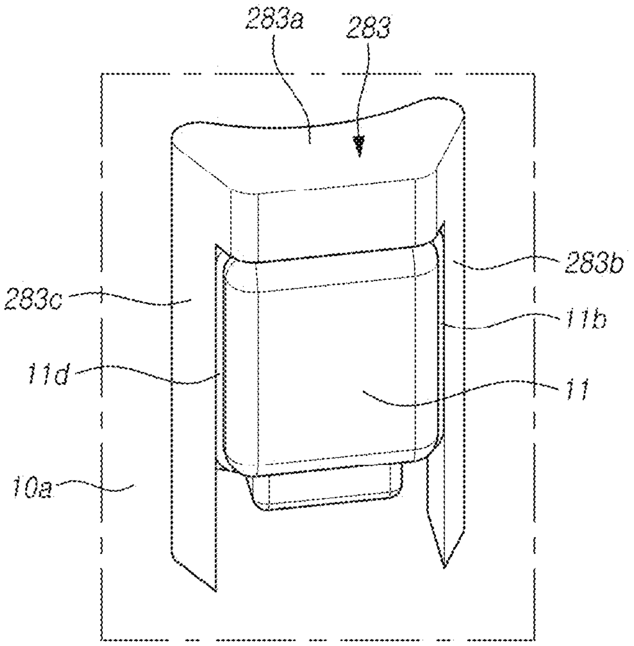
FIG. 18A is an enlarged perspective view illustrating a noise leakage blocking part disposed in a surrounding area of a terminal block provided in an outer surface of a compressor according to various embodiments.
Figure 18B:
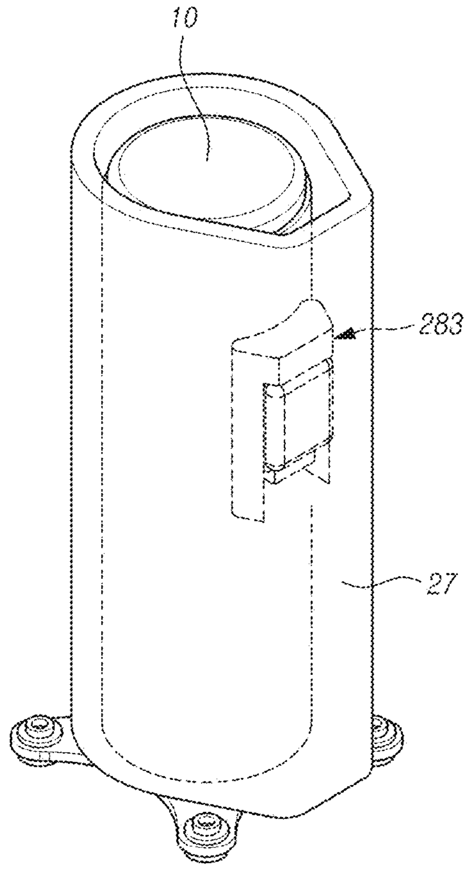
FIG. 18B is a perspective view illustrating a state of disposition of a noise leakage blocking part disposed in a surrounding area of a terminal block provided in an outer surface of a compressor according to various embodiments.

FIG. 18A is an enlarged perspective view illustrating a noise leakage blocking part disposed in a surrounding area of a terminal block provided in an outer surface of a compressor according to various embodiments. FIG. 18B is a perspective view illustrating a state of disposition of a noise leakage blocking part disposed in a surrounding area of a terminal block provided in an outer surface of a compressor according to various embodiments.

Referring to FIGS. 18A and 18B, the noise leakage blocking part 283 according to an embodiment may be disposed between the first, second, or fourth side surface 11*a*, 11*b*, and 11*d* of the terminal block 11 and the side felt 27. The noise leakage blocking part 283 may include a first portion 283*a* extending along the first side surface 11, a second portion 283*b* extending along the second side surface 11*b*, or a third portion 283*c* extending along the fourth side surface 11*d*. The second and third portions 283*b* and 283*c* may face each other. The second and third portions 283*b* and 283*c* may face each other with respect to the first portion 283*a*. For example, each first portion 283*a* may extend in a horizontal direction, and each of the second and third portions 283*b* and 283*c* may extend in a vertical direction, and may be formed to have a substantially linear shape. The shape of the first to third portions 283*a* to 283*c* is not necessarily limited to a linear shape.

According to an embodiment, if the compressor 10 operates, noise generated by the compressor 10 may be primarily minimized and/or reduced by the first to third portions 283*a* to 283*c* of the noise leakage blocking part 283.

Figure 19A:
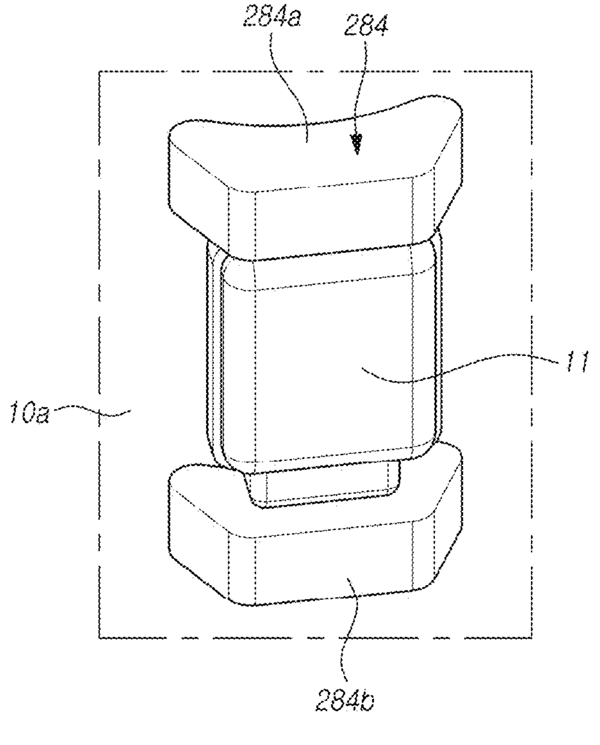
FIG. 19A is an enlarged perspective view illustrating a noise leakage blocking part disposed in a surrounding area of a terminal block provided in an outer surface of a compressor according to various embodiments.
Figure 19B:
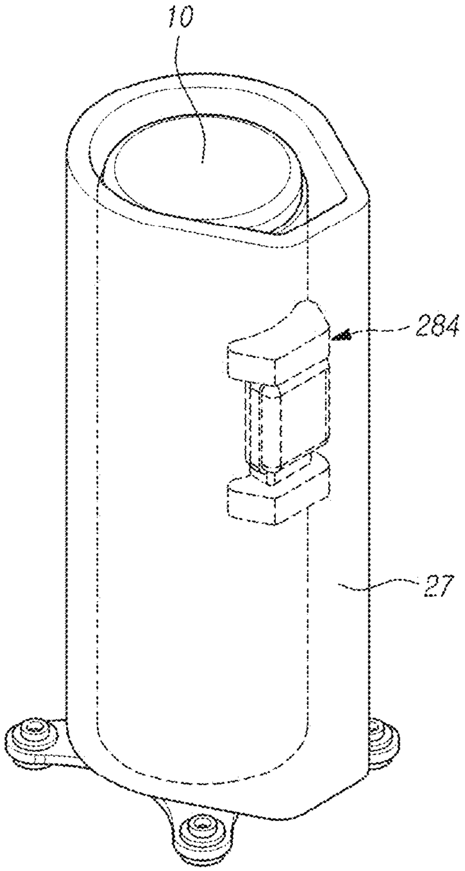
FIG. 19B is a perspective view illustrating a state of disposition of a noise leakage blocking part disposed in a surrounding area of a terminal block provided in an outer surface of a compressor according to various embodiments.

FIG. 19A is an enlarged perspective view illustrating a noise leakage blocking part disposed in a surrounding area of a terminal block provided in an outer surface of a compressor according to various embodiments. FIG. 19B is a perspective view illustrating a state of disposition of a noise leakage blocking part disposed in a surrounding area of a terminal block provided in an outer surface of a compressor according to various embodiments.

Referring to FIGS. 19A and 19B, the noise leakage blocking part 284 according to an embodiment may be disposed between the first and third side surfaces 11*a* and 11*c* of the terminal block 11 and the side felt 27. The noise leakage blocking part 284 may include, e.g., a first portion 284*a* extending along the first side surface 11*a* and a second portion 284*b* extending along the third side surface 11*c*. The first and second portions 284*a* and 284*b* may face each other. The first and second portions 284*a* and 284*b* may face each other with respect to the terminal block 11. For example, each of the first and second portions 284*a* and 284*c* may extend in a horizontal direction and may have a linear shape. The shapes of the first and second portions 284*a* and 284*c* are not necessarily limited to a linear shape.

According to an embodiment, if the compressor 10 operates, noise generated by the compressor 10 may be primarily minimized and/or reduced by the first and second portions 284*a* and 284*b* of the noise leakage blocking part 281.

The terms as used herein are provided merely to describe various embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may refer, for example, to a device able to perform an operation together with another device or parts. For example, a 'device configured (or set) to perform A, B, and C' may be a dedicated device to perform the corresponding operation or may refer, for example, to a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An air conditioner sub-assembly, comprising:
- a compressor;
- a terminal block protruding on an outer circumferential surface of the compressor; and
- a noise blocking device comprising:
  - a side felt disposed to surround the compressor and having an opening configured to allow the terminal block to be visible from an outside;
  - a terminal block cover felt extending from one side of the opening formed in the side felt and configured to open/close at least a portion of the opening; and
  - an inner belt configured to maintain a shape of the side felt, the inner belt being positioned on an inner surface of the side felt at an opening peripheral area, and the inner belt being positioned between at least the side felt and the opening.

2. The air conditioner sub-assembly of claim 1, further comprising a hook and loop fastener provided to couple and/or separate the terminal block cover felt to/from the side felt.

3. The air conditioner sub-assembly of claim 2, wherein the hook and loop fastener includes:
- a first hook and loop fastener disposed around the opening; and
- a second hook and loop fastener configured to be coupled to and/or separated from the first hook and loop fastener and disposed along an edge portion of the terminal block cover felt.

4. The air conditioner sub-assembly of claim 1, wherein the opening includes an upper cut line provided at a position of the side felt facing the terminal block, a lower cut line provided parallel to the upper cut line under the upper cut line, and a right cut line provided to connect one side of the upper cut line and one side of the lower cut line.

5. The air conditioner sub-assembly of claim 4, wherein the terminal block cover felt is configured to rotate an uncut left side portion connecting another side of the upper cut line and another side of the lower cut line to open the opening.

6. The air conditioner sub-assembly of claim 5, further comprising:
- a first hook and loop fastener provided along the upper cut line, the lower cut line, and the right cut line forming the opening in the side felt; and
- a second hook and loop fastener configured to be coupled to and/or separated from the first hook and loop fastener and provided along an upper edge line, right edge line, and lower edge line of the terminal block cover felt.

7. The air conditioner sub-assembly of claim 6, wherein the first hook and loop fastener includes a loop-shaped female hook and loop fastener and the second hook and loop fastener includes a hook-shaped male hook and loop fastener.

8. The air conditioner sub-assembly of claim 6, wherein the first hook and loop fastener includes a hook-shaped male hook and loop fastener and the second hook and loop fastener includes a loop-shaped female hook and loop fastener.

9. The air conditioner sub-assembly of claim 1, wherein the side felt includes:
- a cable hole configured to allow a cable of the compressor to be drawn out; and
- a cable fixing hook and loop fastener having a fixed end fixed to an area around the cable hole and another end including a free end,
- wherein the free end is configured to wind the cable drawn out through the cable hole and is fastened to the fixed end to allow the cable to be fixed to the side felt, and
- wherein a lower end of the opening and the cable hole include a cut line.

10. The air conditioner sub-assembly of claim 1, further comprising:
- an upper cover felt configured to be coupled to and/or separated from the side felt using a hook and loop fastener;
- a third hook and loop fastener provided along an upper edge line in the side felt; and
- a fourth hook and loop fastener configured to be coupled to and/or separated from the third hook and loop fastener and provided along an outer line of the upper cover felt.

11. The air conditioner sub-assembly of claim 10, wherein the third hook and loop fastener includes a loop-shaped female hook and loop fastener and the fourth hook and loop fastener includes a hook-shaped male hook and loop fastener, or the third hook and loop fastener includes a loop-shaped male hook and loop fastener and the fourth hook and loop fastener includes a hook-shaped fourth hook and loop fastener.

12. The air conditioner sub-assembly of claim 11, wherein fitting portions to which bottom supporting members configured to support the compressor on a bottom are configured to be fitted and fixed are provided along a lower end of the side felt,
- wherein a draw-out piping hole is provided in the side felt and configured to allow a draw-out pipe of the compressor to be drawn out to an outside, and wherein a draw-in piping hole is provided in the side felt and configured to allow a draw-in pipe to be drawn into the compressor from the outside.

13. The air conditioner sub-assembly of claim 12, wherein a left side end of the side felt and the draw-out piping hole include a cut line, and wherein an upper end of the side felt and the draw-in piping hole include a cut line.

14. The air conditioner sub-assembly noise of claim 1, wherein the inner belt has a fixed end fixed to the inner surface of the side felt at the opening peripheral area and a free end, and wherein the inner belt comprises a synthetic resin or a metal material.

15. The air conditioner sub-assembly of claim 14, wherein the inner belt includes:

a first inner belt disposed on one side of the opening peripheral area; and a second inner belt disposed on another side of the opening peripheral area and configured to be connected to and/or separated from the first inner belt, wherein the first inner belt is disposed on a left side of the opening, and the second inner belt is disposed on a right side of the opening, and wherein the first inner belt and the second inner belt are configured to be connected to and/or separated from each other by a hook and loop fastener.

16. The air conditioner sub-assembly of claim 14, wherein the inner belt includes a wire belt, and the wire belt includes:

a stop protrusion protruding toward the opening on an outer surface of the terminal block; and at least one wire having one end fixed to an area around the opening and another end fixed to the stop protrusion.

17. The air conditioner sub-assembly of claim 16, wherein the wire includes:

a first wire disposed on one side of the opening; and a second wire disposed on another side of the opening and facing the first wire.

18. The air conditioner sub-assembly of claim 1, further comprising at least one noise leakage barrier disposed between the side felt and one side surface selected from among first to fourth side surfaces of the terminal block, and wherein the noise leakage barrier is disposed in a compressed state in contact between the outer circumferential surface of the compressor, the side felt, and the terminal block.

19. The air conditioner sub-assembly of claim 18, wherein the noise leakage barrier is a shape surrounding the terminal block.

20. The air conditioner sub-assembly of claim 19, wherein the noise leakage barrier includes a plurality of straight portions.

* * * * *